(12) United States Patent
Means (10) Patent No.: US 7,284,364 B2
(45) Date of Patent: Oct. 23, 2007

(54) PASSIVE EXHAUST SUPPRESSOR AND METHOD

(75) Inventor: James L. Means, Lutz, FL (US)

(73) Assignee: Northrop Grumman Ship Systems, Inc., Pascagoula, MS (US)

( * ) Notice: Subject to any disclaimer, the term of this patent is extended or adjusted under 35 U.S.C. 154(b) by 434 days.

(21) Appl. No.: 10/917,212

(22) Filed: Aug. 12, 2004

(65) Prior Publication Data

US 2006/0179815 A1    Aug. 17, 2006

Related U.S. Application Data (60) Provisional application No. 60/501,101, filed on Sep. 8, 2003.

(51) Int. Cl.
*F02C 7/00* (2006.01)

(52) U.S. Cl. .......................................... 60/39.5; 60/264

(58) Field of Classification Search .................. 60/262, 60/264, 39.5; 239/265.17; 440/89 R
See application file for complete search history.

(56) References Cited

U.S. PATENT DOCUMENTS

| | | |
|---|---|---|
| 3,712,054 A | 1/1973 | Regelson et al. |
| 3,817,030 A | 6/1974 | Renius et al. |
| 3,981,143 A | 9/1976 | Ross et al. |
| 4,007,587 A | 2/1977 | Banthin et al. |
| 4,095,417 A | 6/1978 | Banthin |
| 4,099,375 A | 7/1978 | Inglee |
| 4,214,441 A | 7/1980 | Mouritsen et al. |
| 4,215,537 A | 8/1980 | Hurley |
| 4,295,332 A | 10/1981 | Steyer et al. |
| 4,303,035 A | 12/1981 | Burns |
| 4,312,480 A | 1/1982 | Miller |
| 4,566,270 A * | 1/1986 | Ballard et al. ................. 60/264 |
| 4,586,908 A | 5/1986 | Schlichthorst |
| 4,638,632 A | 1/1987 | Wulf et al. |
| 4,713,933 A | 12/1987 | Bandera |
| 4,993,314 A | 2/1991 | Braden et al. |
| 5,000,161 A | 3/1991 | Keimel et al. |
| 5,746,047 A | 5/1998 | Steyer et al. |
| 5,992,140 A | 11/1999 | Hammond et al. |
| 6,010,379 A | 1/2000 | Baumann |

(Continued)

OTHER PUBLICATIONS

*An Introduction to Infrared Signature Suppression* (*For Ships & Aircraft*), J. Thompson, W.R. Davis Engineering Ltd., Jun. 2000, 20 pages.

(Continued)

*Primary Examiner*—L. J. Casaregola
(74) *Attorney, Agent, or Firm*—Alston & Bird LLP (57) ABSTRACT

A passive exhaust system is described that provides effective infrared signature suppression without affecting radar cross-section while maintaining stable function in crosswinds. A passive exhaust system may include an array of ducts with each duct having a primary and secondary nozzle. Central ducts draw in ambient cooling air to create a thick cooling film along exterior surfaces and cause plume dilution, stabilize the plume flow in a crosswind, and prevent heating of visible surfaces. Visible surfaces may incorporate radar absorbing materials and may be inclined at an angle or fabricated with a diffuse surface to prevent specular reflection. Visible surfaces may be constructed from or covered with low infrared emissivity materials. A variable passive flow controller ensures a sufficient velocity exhaust flow.

22 Claims, 5 Drawing Sheets

U.S. PATENT DOCUMENTS

| | | | |
|---|---|---|---|
| 6,016,651 A | | 1/2000 | Hammond et al. |
| 6,055,804 A | | 5/2000 | Hammond et al. |
| 6,122,907 A | | 9/2000 | Frawley |
| 6,134,879 A | * | 10/2000 | Frawley et al. .............. 60/39.5 |
| 6,182,440 B1 | | 2/2001 | Bilenas et al. |
| 6,253,540 B1 | | 7/2001 | Chew et al. |
| 6,971,240 B2 | | 12/2005 | Wollenweber |
| 6,988,674 B2 | | 1/2006 | Steyer et al. |

OTHER PUBLICATIONS

*Infrared Signature Systems*, http://www.ach.fr/services_irss-systems.stm, Aug. 25, 2003, 1 page.

*Bernoulli's Equation*, http://www.grc.nasa.gov/WWW/Wright/airplane/bem.html, Sep. 2, 2003, 2 pages.

*Using The Coanda Effect*, http://www.aardvark.co.nz/pjet/coanda.shtml, Aug. 12, 2004, 3 pages.

*The Coanda Effect*, http://inaudin.free.fr/html/coanda.htm, Aug. 12, 2004, 3 pages.

*Eductor/Diffuser IRSS*, http://www.davis-eng.on.ca/eductdiff.htm, Aug. 12, 2004, 2 pages.

*DRES-Ball IRSS*, http://www.davis-eng.on.ca/dresball.htm, Aug. 12, 2004, 2 pages.

*Advanced IR Suppression*, http://www.davis-eng.on.ca/advir.htm, Aug. 12, 2004, 4 pages.

*The "Coanda Effect", History of The "Coanda Effect"*, http://www.fortunecity.com/greefield/bp/16/coanda.html, Aug. 12, 2004, 12 pages.

\* cited by examiner

PASSIVE EXHAUST SUPPRESSOR AND METHOD

CROSS REFERENCE TO RELATED APPLICATION

This application claims priority to and the benefit of the filing date of provisional application entitled "Passive Exhaust Suppressor," assigned Ser. No. 60/501,101 and filed Sep. 8, 2003, which is hereby incorporated by reference.

FIELD OF THE INVENTION

The present invention relates generally to exhaust suppression, and, more particularly, to passive exhaust infrared signature suppression with low wind sensitivity and a consistent radar cross-section.

BACKGROUND

Infrared or heat-seeking detection systems and radar detection systems are employed, for example, for weapon target and guidance, reconnaissance, and classification purposes. Exhaust from the engine of a ship heats visible surfaces of the ship and creates a plume of hot gas, particularly gas turbine engines which produce substantial volumes of high velocity, hot gas when operating at maximum power output. Gas turbines provide high power output to maximize the speed of a ship with relatively small size and light weight which makes them suitable for various sizes of ships, such as small, fiberglass ships, and a variety of combat missions, such as littoral combat. These heated surfaces and plumes of hot gas create an infrared signature that may be detected and used for actively targeting the ship for offensive tactics and other purposes.

Various systems have been employed to suppress the infrared signature created by the exhaust from a ship. Some methods include aspirating cooling air and spraying water or other liquids into the hot exhaust, hiding hot surfaces, and expelling exhaust gas at or below the surface of the water. For example, a previous system has included round mixers with many stages of thin-film cooling. While effective for cooling the exhaust, this type of system creates a protrusion from a normal or conventional exhaust system, such as a series of ejectors projecting above a conventional shroud. This protrusion is identifiable by a radar detection system as creating a different radar signature than would be detected without the exhaust suppression system. Other systems have been developed to reduce the infrared signature, but these systems often are inefficient, are limited in infrared bandwidth, are sensitive to crosswinds, create excess sound or vibration radiation, alter the radar cross-section of the ship, and burden the ship under increased weight vertical center of gravity (KG), power and fuel consumption, and cost. For example, some systems require air pumps, fans, and other active operations for suppressing the infrared signature created by the exhaust.

A new system for suppressing exhaust is needed to address the problem of infrared detection of the heat signature produced by exhaust, such as the exhaust of a gas turbine engine of a ship, while avoiding the deficiencies of prior systems. This need is stressed by the increasing use of gas turbine engines on a variety of ships, such as naval combat ships.

SUMMARY

A passive exhaust suppressor is provided for reducing signatures across multiple spectrums including infrared and radar wavelengths. The present invention is passive, does not extend the radar cross-section of a ship or raise the vertical center of gravity of a ship, and provides effective infrared signature suppression while maintaining stable function in crosswinds. As used herein, exhaust suppression does not refer to a reduction in the volume of exhaust but refers to decreasing the infrared signature created by the heat of the exhaust and avoiding the creation of an identifiable radar cross-section associated with the suppression.

An embodiment of a passive exhaust suppressor of the present invention includes multiple ducts, such as a three-by-two array of six ducts with six primary and six secondary nozzles, each duct having a primary nozzle for intake of engine exhaust and a secondary nozzle positioned at the exit of the primary nozzle. A three-by-two array of ducts creates two central ducts that may draw ambient, cooling air into the thermal core of exhaust through an ejector of a passive exhaust suppressor. The effects of drawing cooling air into the thermal core of exhaust include plume dilution, or cooling of the hot exhaust gas with ambient air; stabilizing the plume flow in a crosswind; and preventing heating of visible surfaces. The secondary nozzles are shaped, tilted, and positioned so hot flows of exhaust from the primary nozzles attach to the inboard surfaces of the secondary nozzles that are hidden from view. The array of stacked primary and secondary nozzles, therefore, creates a series of induced airflows to keep visible surfaces at an ambient or acceptably cool temperature and envelop the hot exhaust plume with cooler or ambient air. The secondary nozzles are enclosed within a shroud positioned along at least part of the primary nozzles and extending above the terminal ends of the secondary nozzles and may be supported and/or partially hidden by a view-blocking framework. This formation, with the function of the nozzle array, obstructs the visibility of hot internal surfaces.

An embodiment of a passive exhaust suppressor of the present invention may be shaped so as not to alter the radar cross-section. For example, the duct array and view-blocking framework preferably do not protrude above the shroud, and no edges or facets are introduced to alter an existing radar cross-section, or radar signature.

Visible surfaces of an embodiment of a passive exhaust suppressor of the present invention may incorporate radar absorbing materials and may be inclined at an angle or fabricated with a diffuse surface to prevent specular reflection. Visible surfaces may also be constructed from or covered with low infrared emissivity materials.

Also provided is a variable passive flow controller to ensure that the exhaust flow that is emitted from a primary nozzle has a sufficient velocity to achieve that desired flow effect through a secondary nozzle, such as drawing cooling air into the suppressor and causing hot flows of exhaust to attach to non-visible surfaces as a result of the Coanda effect.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements.

While one use of the present invention may be in the field of exhaust suppression for a ship, it will be appreciated from the following description that the invention is also useful for suppressing the infrared signature created by the heat of the exhaust from various types of exhaust systems, such as exhaust systems on different vehicles. The passive exhaust suppressor of the present invention may be used with various propulsion and auxiliary generating systems. The functional principles and relative design are, therefore, not limited to ship exhaust systems. Nonetheless, the passive exhaust system of the present invention will be hereinafter described in conjunction with a gas turbine engine of a ship for purposes of illustration but not of limitation.

Figure 1:
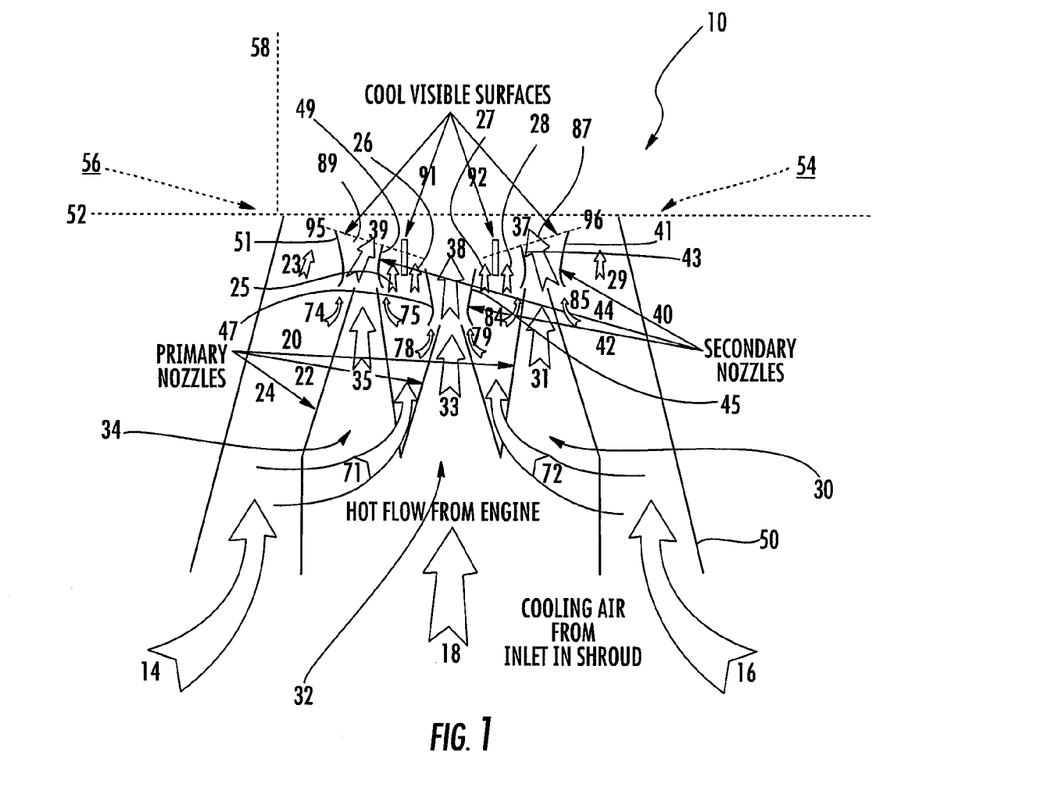
FIG. 1 is a diagram of a passive exhaust suppressor of one embodiment of the present invention as seen from the end along the longitudinal axis of the suppressor.

FIG. 1 is a diagram of a passive exhaust suppressor of one embodiment 10 of the present invention as seen from the end or along the longitudinal axis of the suppressor. Embodiments of the present invention may be aligned with the longitudinal axis of the suppressor aligned with the bow and stern of a ship or aligned with starboard and port of a ship, or other vehicle. Embodiments of the present invention may not be sensitive to crosswinds along any particular axis of a vehicle, permitting alignment of embodiments of the present invention along any axis of a vehicle. From the view shown in FIG. 1. three ducts 20/30, 22/32, 24/34 can be seen. Each duct has a primary 20, 22, 24 and a secondary 40, 42, 44 nozzle. In this embodiment, another row of three ducts are positioned directly behind this row, as seen from the side view of FIG. 2, to create a three-by-two array of exhaust ducts. However, a passive exhaust suppressor of the present invention may have any number of ducts and the ducts may be arranged differently. Ducts and nozzles that are located towards the inside or center of a duct array are referred to as central or internal ducts and nozzles 22, 42. Ducts and nozzles that are located towards the outside or exterior of a duct array are referred to as outside, side, or exterior ducts and nozzles 20, 24, 40, 44.

As exhaust flows from an engine, such as, but not limited to, the exhaust from a gas turbine engine which is produced in substantial volume at high velocity with a high temperature, the exhaust passes into primary nozzles 20, 22, 24. As noted above, gas turbine engines provide high power output to maximize the speed of a ship with relatively small size and light weight which makes them suitable for various sizes of ships, such as small, fiberglass ships, and a variety of combat missions, such as littoral combat. The intakes 30, 32, 34 of the primary nozzles 20, 22, 24 may be sized, spaced, and shaped to achieve even flow of hot exhaust 31, 33, 35 through each of the primary nozzles 20, 22, 24, typically depending at least in part upon the flow dynamics of the thermal core 18 incident upon the primary nozzles 20, 22, 24. An even flow of exhaust 31, 33, 35 through each of the primary nozzles 20, 22, 24 increases the efficiency of a passive exhaust suppressor of the present invention by distributing the thermal core or incident gas 18 of the exhaust through the primary nozzles 20, 22, 24 to better achieve dilution of the thermal core 18 using cooling air. The hot exhaust exits the primary nozzles 20, 22, 24 and passes into and through the secondary nozzles 40, 42, 44 before creating an exhaust plume.

Induced airflow 14, 16 is used to envelope the hot thermal core 18 of exhaust with cooler, ambient air. This is also described as embedding layers of cool air into the exhaust to create a resulting plume with a decreased infrared signature. This effect is referred to as plume dilution. To quantify plume dilution, temperatures of the exhaust plume may be recorded at various positions within the exhaust plume, typically positions that are orthogonal to the axis 58 representing the directional flow of the plume. The axis 58 representing the directional flow of the plume is usually normalized to the exit plane 52 of the shroud 50 defined by the upper edges of the shroud. Plume dilution may be defined by a ratio of recorded temperature less the temperature of the ambient air to the maximum recorded temperature less the temperature of the ambient air, a ratio of the temperature of the cooling air to the temperature of the hot air flow, or a ratio of the temperature of the cooling air to the temperature of the total mass flow sum of cooling air and hot exhaust. By way of a non-limiting example, one embodiment of the present invention has been tested to achieve a 0.8 plume dilution at 36 inches from the exit plane 52 of the shroud. Thus, the temperature differential between the recorded temperature of the exhaust plume and the cooling air had decreased by 80% between the exit plane 52 of the shroud and at 36 inches from the exit plane 52 of the shroud.

Figure 2:
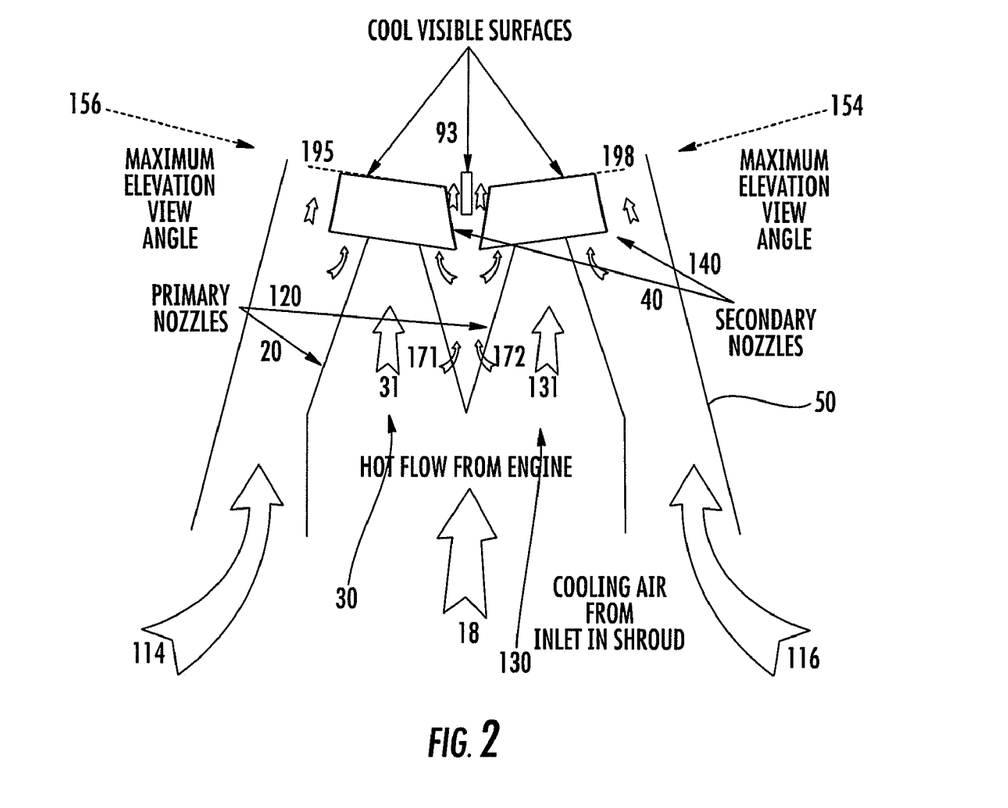
FIG. 2 is a diagram of a passive exhaust suppressor of one embodiment of the present invention as seen from the side and along the lateral axis of the suppressor.

The induced flow of ambient cooling air 14, 16, 71, 72, 74, 75, 78, 79, 84, 85 is caused by the flow of exhaust gas 18, 31, 33, 35 through the ducts 20/40, 22/42, 24/44, creating a relative low dynamic pressure between the suppressor 10 and the ambient air outside the suppressor 10. The ambient air enters or is drawn into the suppressor 10 through an opening at the lower edge of the shroud 50 that is also referred to as an ejector. The amount of cooling air drawn into the suppressor 10 is related in part to the velocity of the exhaust at the exits of the primary nozzles 20, 22, 24, with the low dynamic pressure caused by the velocity of exhaust flow. The low dynamic pressure draws cooling airflow 71, 72 into the regions between the ducts. In FIGS. 1 and 2, the cooling airflows 71, 72, 171, 172 that pass into regions between ducts are three-dimensional on two-dimensional figures and do not pass from inside the primary nozzles 20, 24, 120 but flow from regions around the ducts. The primary nozzles 20, 22, 24 may be insulated and/or covered with a low emissivity coating to minimize the heating of the cooling air 14, 16 as it flows from the ejector, passing along the outside of the primary nozzles 20, 22, 24, and before entering the secondary nozzles 40, 42, 44.

Figure 3:
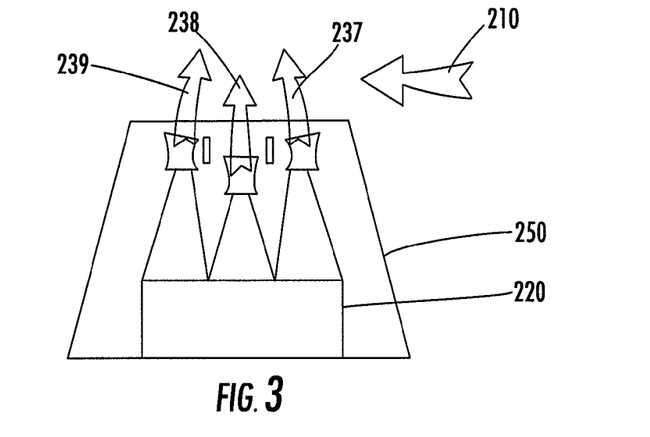
FIG. 3 is a diagram of the effect of crosswinds on a passive exhaust suppressor of one embodiment of the present invention.

The central ducts 22 in the array create a lower dynamic pressure between the exits of the outer secondary nozzles than the ambient cooling air around the outer perimeter of the outer secondary nozzles. The pressure differential draws exhaust flow from the outer secondary nozzles 40, 44 toward the flow of exhaust from the central secondary nozzles 42 and helps stabilize the plume flow in a crosswind. FIG. 3 shows the stabilizing central flow. Low dynamic pressure created by each exhaust flow 18, 31, 33, 35, 37, 38, 39 also draws cooling air into the regions between the ducts 71, 72 and into the secondary nozzles 74, 75, 78, 79, 84, 85.

Using the Coanda effect, a passive exhaust suppressor of the present invention can generally control exhaust such that only non-visible surfaces become hot, thereby partially controlling the infrared signature created by hot exhaust. The Coanda effect describes the phenomenon whereby a fluid flow tends to follow a nearby convex contour when directed at a tangent to the convex contour if the incident angle is not so sharp as to prevent the fluid flow from attaching. The Coanda effect is employed to cause hot exhaust 37, 39 to adhere to the surfaces of the secondary nozzles that are not visible 43, 49; these interior or inboard surfaces are also referred to as non-visible walls and surfaces. Interior walls 43, 49 of the outside secondary nozzles 40, 44 are shaped with convex contours. By positioning the exits of the primary nozzles 20, 24 closer to interior walls 43, 49 of the secondary nozzles 40, 44 than the exterior walls 41, 51 of the secondary nozzles 40, 44, the flows of exhaust 31, 35 from the primary nozzles 20, 24 attach to the interior walls 43, 49 of the secondary nozzles 40, 44 because the flows 31, 35 are directed from the primary nozzles 20, 24 at a tangent to convex surfaces in the secondary nozzles 40, 44.

By attaching the flows 37, 39 of hot exhaust to walls 43, 49 of the secondary nozzles 40, 44, the flows of exhaust 37, 39 and cooling air 87, 89 through the secondary nozzles 40, 44 becomes much more stable and relatively insensitive to wind. This also creates flow separation between the hot exhaust 37, 39 and the outside walls of the secondary nozzles that allows cooling air 87, 89 to pass adjacent the outside, visible walls 41, 51 and become embedded with the exhaust plume to lower the temperature of the exhaust plume. Separating hot exhaust 37, 39 from cooling air 87, 89 along the outside, visible walls 41, 51 of the secondary nozzles 40, 44 allows the visible surfaces 41, 51 of the secondary nozzles 40, 44 to remain at cool temperatures proximate the temperature of the cool ambient air. High-speed primary nozzle design may provide greater efficiency by creating a higher pressure differential to draw ambient cooling air into the system and more easily achieve the Coanda effect to control the flow of hot exhaust gas through the secondary nozzles and decrease sensitivity to wind. A flow will remain attached to non-visible surfaces of a secondary nozzle unless a significant crosswind force or low pressure detaches the flow from the wall.

The spatial relationship and sizing of primary and secondary nozzles in an array of an embodiment of a passive exhaust suppressor of the present invention is dependent upon the application and desired results, including the backpressure on the engine, and includes, but is not limited to, for example, the shape of the nozzles, the exhaust intake of the primary nozzles, and the height of the secondary nozzles. The spatial relationship between primary and secondary nozzles is determined by the amount of dilution air necessary to achieve a desired plume temperature or plume dilution. The sizing and positioning of the secondary nozzles above the primary nozzles is determined by the estimated exhaust flow velocity, the desired Coanda effect to attach hot exhaust along a non-visible sidewall of the secondary nozzles, and the desired thick-film of cooling air that passes between the hot exhaust and the visible wall of the secondary nozzles. The lower the flow velocity, for example, the closer the flow from a primary nozzle must be to a convex surface of a secondary nozzle to allow the Coanda effect to occur. The spatial relationship between secondary nozzles is determined by the distance necessary to insure diffusion of the thermal core of exhaust and to prevent hot exhaust from impinging upon any visible surfaces of the ship or suppressor. As the distance between secondary nozzles increases, the thermal core of exhaust is further diffused and more cooling air will mix with the hot exhaust to increase the plume dilution. For example, on a ⅛th volumetric scale model, 4 inches between a cool wall 41, 51 and a heat flow 37, 39 and ½ inch between the primary nozzle 20, 24 and the hot surface 43, 49 of a secondary nozzle 40, 44 were appropriate spacing ratios to achieve acceptable passive exhaust suppression results. However, the present invention may be scaled for various applications and relatively spaced to achieve various results.

Figure 4:
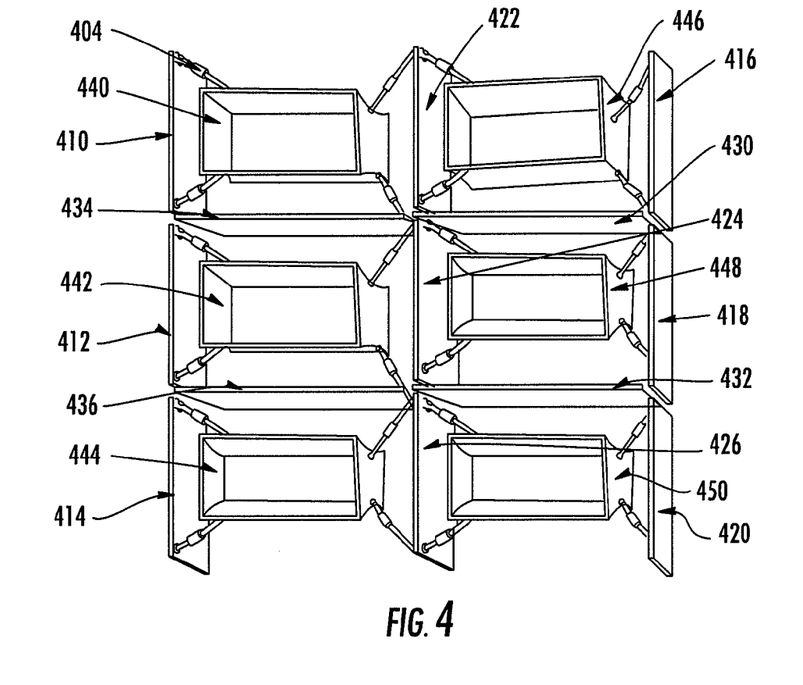
FIG. 4 is a diagram of a portion of a passive exhaust suppressor of one embodiment of the present invention showing a view-blocking framework.

Visibility of a surface of a passive exhaust suppressor is determined by whether or not the surface can be seen at or below a maximum elevation view angle 54, 56. In addition to the shroud 50 that surrounds the primary 20, 22, 24 and secondary 40, 42, 44 nozzles and creates an inlet or ejector for cooling air, view blockers or a view-blocking framework 91, 92, 93 may be positioned around the exits of the secondary nozzles 40, 42, 44 to prohibit specular reflection from the hot surfaces 43, 45, 47, 49 of the secondary nozzles 40, 42, 44 to which hot exhaust is attached by the Coanda effect 43, 49 or which is otherwise not sufficiently cooled 45, 47. A view-blocking framework 91, 92, 93 helps to control which surfaces are visible 41, 51 or non-visible 43, 45, 47, 49 at a maximum elevation viewing angle 54, 56 as determined by the height of the view blockers 91, 92, 93 in relation to exits of the secondary nozzles 40, 42, 44 and the upper edges of the shroud 50. An embodiment of a view-blocking framework is shown in FIG. 4 and described below. Visible surfaces of an embodiment of a passive exhaust system of the present invention may incorporate radar absorbing materials (RAM) and may be inclined at an angle or fabricated with a diffuse surface to prevent specular reflection. Visible surfaces may be constructed from or covered with low infrared emissivity materials, also referred to as emissivity control coatings.

An embodiment of a passive exhaust suppressor of the present invention may be shaped to decrease specular reflection and/or reduce, if not eliminate, visibility of hot surfaces. For example, the exit planes 95, 96 of the outside secondary nozzles 40, 44 may be angled or tilted towards the center of the duct array, central ducts 42 may terminate with exit planes 97 at a lower elevation than outside ducts 40, 44 to hide the cent al ducts 42 behind view blockers 91, 92 that also block interior walls 43, 49 of outside secondary nozzles 40, 44, and a shroud 50 may terminate at a higher elevation 52 than the ducts 20/40, 22/42, 24/44. The angle of the exit plane 95, 96 of an outside secondary nozzle 40, 44 is such that the exterior wall 41, 51 of the secondary nozzle 40, 44 blocks the interior wall 43, 49 of the secondary nozzle 40, 44 at and below the maximum elevation view angle 54, 56. The elevations or heights of the shroud exit plane 52, view blockers 91, 92, and central ducts 42 are similarly selected to prevent viewing of internal walls 43, 49 of secondary nozzles 40, 44 and the walls 45, 47 of central secondary nozzles 42 at and below the n maximum elevation view angle 54, 56. These design characteristics may be adjusted to increase the maximum elevation view angle at and below which hot surfaces of the suppressor are not visible and to maintain a constant radar cross-section for a ship.

FIG. 2 is a diagram of a passive exhaust suppressor of the embodiment of the present invention depicted in FIG. 1, as seen from the side or along the lateral axis of the suppressor. From a side view, a second row of ducts 120, 140 can be seen that corresponds to the view of an embodiment of a passive exhaust suppressor of the present invention shown in FIG. 1. The exit planes of the secondary nozzles 195, 198 are tilted towards the center of the nozzle array of the suppressor to increase the elevation view angle 154, 156 below which hot surfaces of the suppressor are not visible.

FIG. 3 is a diagram of the effect of crosswinds on a passive exhaust suppressor of one embodiment of the present invention. Crosswinds 210 can blow hot exhaust onto a visible surface. Because of the low dynamic pressure created by the flow of exhaust 238 through central ducts, the exhaust 237, 239 from external ducts is drawn towards the central flow 238, creating a stable exhaust plume. The additional stability provided by the Coanda effect of attaching hot exhaust 237, 239 to non-visible sides of the secondary nozzles further desensitizes the exhaust plume from a passive exhaust suppressor of the present invention to crosswinds 210. For example, in FIG. 3, because of the attachment due to the Coanda effect, the left exterior exhaust flow 237 is not affected by the crosswind 210 in such a manner as to flow onto and heat the exterior, visible sidewall of the secondary nozzle, but remains attached to the interior, non-visible, wall of the secondary nozzle.

FIG. 4 is a diagram of a portion of a passive exhaust suppressor of one embodiment of the present invention showing an example positioning for a view-blocking framework. View blockers 422, 424, 426, 430, 432, 434, 436 may be located between secondary nozzles 440, 442, 444, 446, 448, 450 and positioned high enough to block hot surfaces at and below a maximum elevation view angle, as further described with reference to FIG. 1. A view-blocking framework may be a single structure or separate view blockers mounted between 422, 424, 426, 430, 432, 434, 436 and/or around 410, 412, 414, 416, 418, 420 secondary nozzles 440, 442, 444, 446, 448, 450. The orientation of a passive exhaust suppressor of the present invention may determine whether view blockers or a view-blocking framework may be added outside secondary nozzles. The embodiment of FIG. 4 shows thirteen view blockers 410, 412, 414, 416, 418, 420, 422, 424, 426, 430, 432, 434, 436, such as slats, ribs or the like, forming an interconnected view-blocking framework. View blockers 422, 424, 426, 430, 432, 434, 436 may be located between all of the secondary nozzles, or may be located, as a non-limiting example, on only two sides 410, 412, 414, 416, 418, 420 of the secondary nozzle array. The absence of view blockers on two other sides of the array is exemplary of an embodiment where the installation of a passive exhaust suppressor can be seen at or below a maximum elevation view angle only from two sides, and where, for example, other parts of a ship block the view from the other two sides such at view blockers may not be necessary on those other two sides.

Figure 5:
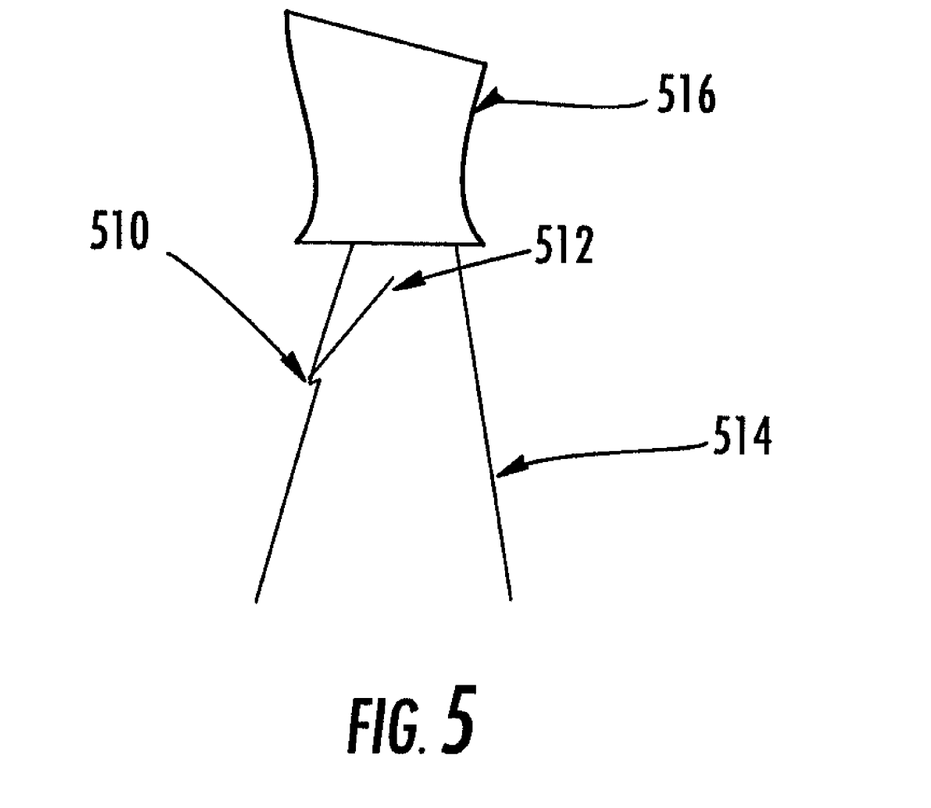
FIG. 5 is a passive flow controller for a passive exhaust suppressor of one embodiment of the present invention.

FIG. 5 is a passive flow controller for a passive exhaust suppressor of one embodiment of the present invention. A passive flow controller of an embodiment of a passive exhaust suppressor of the present invention may be included in a primary nozzle 514 to ensure that a sufficient velocity exhaust flow is emitted from a primary nozzle to achieve the desired flow effect through a secondary nozzle 516. Alternatively, a passive flow controller may be in flow communication within a primary or secondary nozzle or proceeding a duct in the flow of exhaust. Sufficient velocity exhaust flow is required to employ the Coanda effect to attach hot exhaust to non-visible surfaces of secondary nozzles and to create low dynamic pressures that draw cooling air into the suppressor and stabilize the exhaust plume. The passive flow controller of an embodiment of a passive exhaust suppressor of the present invention may be variable. This means that the weight of the flow controller may be modified to determine the necessary flow velocity to open the flow controller. If a higher velocity is required, the weight of the passive flow controller may be increased. If less flow velocity is required, the weight of a passive flow controller may be decreased. A damper may be included in a passive flow controller of an embodiment of the present invention to prevent a flapper from chattering and allow the flapper to either be wide open or fully closed. A damper of an embodiment of the present invention may be a plate 512 with a weight determined by the minimum desired exit velocity. The plate may be hinged and recessed 510 into a wall of a primary nozzle 514 such that when the plate 512 is open, the plate 512 is recessed against the wall and does not become an obstruction to the flow of exhaust.

Figure 6:
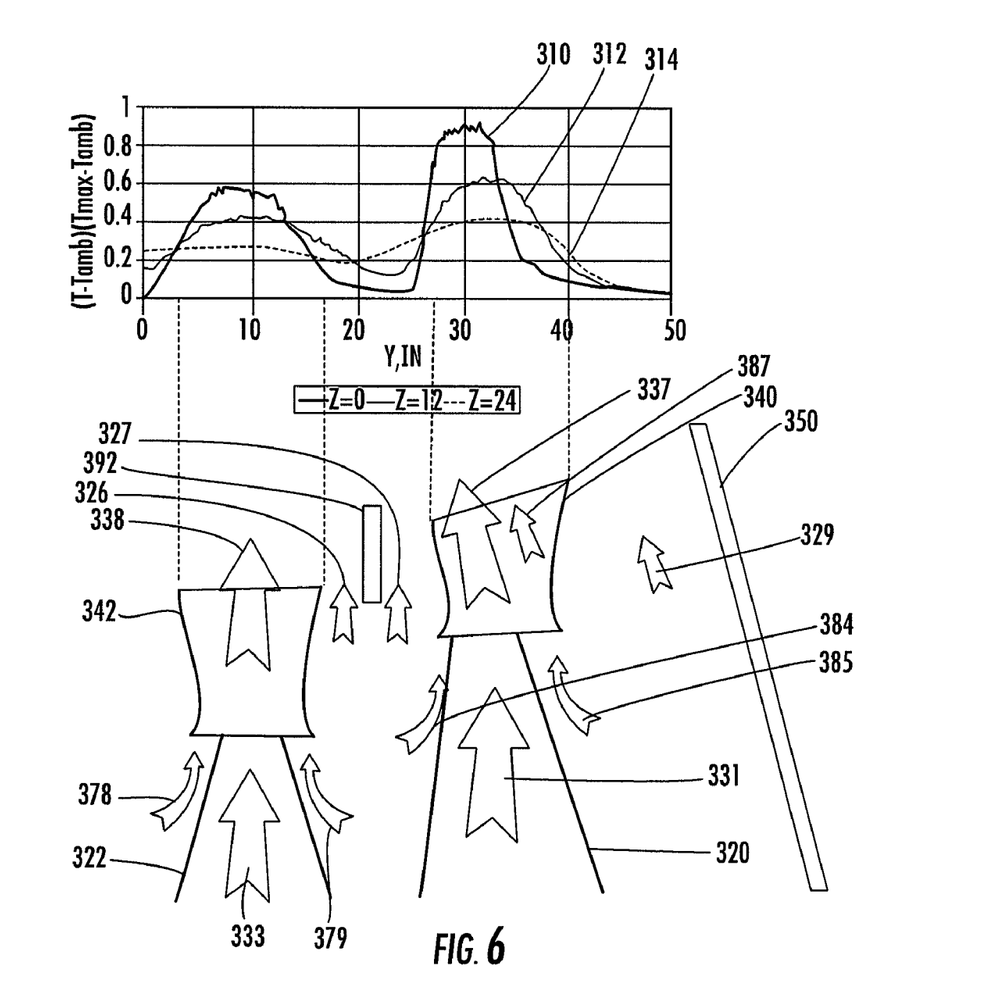
FIG. 6 is a graph of plume dilution from an outside and a central secondary nozzle of a passive exhaust suppressor of one embodiment of the present invention.

FIG. 6 is a graph of plume dilution from an outside nozzle and a central secondary nozzle of a passive exhaust suppressor of one embodiment of the present invention. The graph shows the heat from exhaust flow 337, 338 from two ducts, a central duct 322/342 and an exterior duct 320/340. The horizontal axis (y inches) begins at zero just outside a wall of a secondary nozzle 342 of a central duct 322/342 and passes over the central duct 322/342 and an outer duct 320/340 as y increases. The positioning is shown by the depiction of a corresponding portion of a nozzle array located below the graph. The vertical axis is a temperature ratio for plume dilution of recorded temperature less the temperature of the ambient air to the maximum recorded temperature less the temperature of the ambient air $(T-T_{amb})/(T_{max}-T_{amb})$. The temperature is shown at three positions (z=0 (310), 12 (312), and 24 (314)) inches) along the z-axis that is zero at the exit plane of the shroud 350 and increases in distance away from the shroud 350.

The graph shows how the temperature of an exhaust plume from an embodiment of a passive exhaust suppressor of the present invention decreases rapidly as cooling air is introduced with the hot exhaust. The localized plume temperatures are separated by a layer of cooling air 326, 327 induced between the warmer plume flows 337, 338. The relative temperature differentials between the central duct 322/342 and exterior duct 320/340 are primarily caused by the exit of the central secondary nozzle 342 being located below the exit of the exterior secondary nozzle 340. Thus, a central duct 322/342 achieves increased dilution, mixing with cooling air, than an outside duct 320/340 at the exit plane of the shroud 350. For example, at z=0 (310), the plume dilution of the central duct 322/342 at y=10 is approximately 0.57 and the plume dilution of the outer duct 320/340 at y=30 is approximately 0.9; however, at z=24 (314), the difference is decreased to plume dilutions of 0.26 and 0.4, respectively.

In another embodiment of the present invention, directing surfaces may be used instead of secondary nozzles. A directing surface may be shaped with a convex surface to permit attachment of a hot exhaust along the convex surface of the directing surface, thus directing the flow of hot exhaust and possibly stabilizing the exhaust plume against crosswinds. These directing surfaces would be hot surfaces which would preferably be hidden from view by a shroud and view blockers of a view blocking framework. Further, because a directing surface does not have a visible exterior wall, as does a secondary nozzle, the thick-film of cooling air is not required to keep a visible exterior will cool which does not exist when using directing surfaces. Rather, the flow of cooling air cause by the low pressure of the exhaust flow may mix with the hot exhaust to provide plume temperature dilution.

Herein provided and described is a passive exhaust system which provides effective infrared signature suppression without affecting radar cross-section while maintaining stable function in crosswinds. A passive exhaust system may include an array of ducts with each duct having a primary and secondary nozzle. Central ducts draw in ambient cooling air to create a thick-film and cause plume dilution, stabilize the plume flow in a crosswind, and prevent heating of visible surfaces. Visible surfaces may incorporate radar absorbing materials and may be inclined at an angle or fabricated with a diffuse surface to prevent specular reflection. Visible surfaces may be constructed from or covered with low infrared emissivity materials. A variable passive flow controller ensures a sufficient velocity exhaust flow.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A passive exhaust suppressor, comprising:
   an array of at least three ducts, each duct comprising:
      a primary nozzle; and
      a secondary nozzle, wherein at least one duct of said array comprises one of said secondary nozzles having internal side with a convex contour and positioned at the exit of one of said primary nozzles to effect exhaust exiting said one of said primary nozzles and substantially directed at a tangent to said convex contour to attach to said convex contour of said internal side of said one of said secondary nozzles; and
   a shroud, positioned around the array of ducts to create an inlet adjacent to said primary nozzles and an exit plane located so that each of said secondary nozzles are positioned within said shroud.

2. The passive exhaust suppressor of claim 1, further comprising a view-blocking framework positioned around said secondary nozzles to block the view from around said shroud at a view angle below a maximum elevation view angle of said sides of said secondary nozzles to which exhaust has attached.

3. The passive exhaust suppressor of claim 2, wherein said view-blocking framework comprises view blockers between at least some of said nozzles of said array.

4. The passive exhaust suppressor of claim 2, further comprising radar suppression materials covering at least a portion of a visible surface of said view-blocking framework.

5. The passive exhaust suppressor of claim 2, further comprising infrared suppression materials covering at least a portion of a visible surface of said view-blocking framework.

6. The passive exhaust suppressor of claim 1, further comprising a passive flow controller in fluid communication with at least one of said primary nozzles.

7. The passive exhaust suppressor of claim 6, wherein said flow controller comprises a weighted plate wherein the weight of said plate is selected to provide at least a minimum velocity of exhaust passing through said nozzle.

8. The passive exhaust suppressor of claim 7, wherein said weighted plate is hinged and recessed into a wall of said nozzle.

9. The passive exhaust suppressor of claim 6, further comprising a passive flow controller in each of said primary nozzles.

10. The passive exhaust suppressor of claim 1, wherein said array of ducts comprises six primary nozzles and six secondary nozzles in a three-by-two pattern.

11. The passive exhaust suppressor of claim 1, wherein said array of ducts defines at least one interior duct providing a lower pressure at the interior of an exit plane of said array than the pressure provided by exterior ducts at the exterior of the exit plane of the array for stabilizing an exhaust plume exiting said secondary nozzles.

12. The passive exhaust suppressor of claim 1, wherein said secondary nozzles are positioned at the exits of said primary nozzles to permit the induction of cooling air into the secondary nozzles and to create a film of cooling air along the exterior surface of said secondary nozzles, wherein the cooling air is colder than the exhaust.

13. The passive exhaust suppressor of claim 1, further comprising radar suppression materials covering at least a portion of a visible surface of at least one of said ducts and said shroud.

14. The passive exhaust suppressor of claim 1, further comprising infrared suppression materials covering at least a portion of a visible surface of at least one of said ducts and said shroud.

15. A gas propulsion system in a ship comprising a gas turbine engine and a passive exhaust suppressor of claim 1 for receiving exhaust from said gas turbine engine.

16. The gas propulsion system of claim 15, wherein said ship is a naval combat ship.

17. A passive exhaust suppressor, comprising:
   an array of at least three ducts, each duct comprising:
      a primary nozzle; and
      a directing surface, wherein at least one duct of said array comprises one of said directing surfaces having an internal side with a convex contour and positioned at the exit of one of said primary nozzles to effect exhaust exiting said one of said primary nozzles and substantially directed at a tangent to said convex contour to attach to said convex contour of said internal side of said one of said directing surfaces; and
   a shroud, positioned around the array of ducts to create an inlet adjacent to said primary nozzles and an exit plane located so that each of said directing surfaces are positioned within said shroud.

18. A passive exhaust suppressor, comprising:
   an array of at least three ducts, each duct comprising:
      a primary nozzle; and
      a secondary nozzle positioned at the exit of said primary nozzle to permit the induction of cooling air into the secondary nozzle, wherein said array defines at least one interior duct and at least two exterior ducts, wherein at least one of said interior ducts is configured to provide a lower pressure at the interior of an exit plane of said array than the pressure provided by exterior ducts at the exterior of the exit plane of the array and for stabilizing an exhaust plume exiting said secondary nozzles, and wherein the cooling air is colder than the exhaust of the exhaust plume; and a shroud, positioned around the array of ducts to create an inlet adjacent to said primary nozzles and an exit plane located so that each of said secondary nozzles are positioned within said shroud.

19. The passive exhaust suppressor of claim 18, wherein said at least one of said interior nozzles comprises an exit plane terminating noncontiguously with exit planes of said exterior ducts.

20. The passive exhaust suppressor of claim 19, wherein said at least one of said interior nozzles comprises a primary nozzle with an exit plane terminating noncontiguously with exit planes of primary nozzles of said exterior ducts.

21. The passive exhaust suppressor of claim 19, wherein said at least one of said interior nozzles comprises a secondary nozzle with an exit plane terminating noncontiguously with exit planes of secondary nozzles of said exterior ducts.

22. The passive exhaust suppressor of claim 18, wherein said at least one of said interior nozzles is configured to emit exhaust having a higher velocity than exhaust exiting said exterior ducts.

* * * * *